(12) United States Patent  
Puluc et al.

(10) Patent No.: US 8,398,120 B2  
(45) Date of Patent: Mar. 19, 2013

(54) CAST IRON GLADHAND

(75) Inventors: Oscar A. Puluc, Downey, CA (US); Zhimin Guo, Cerritos, CA (US); Thomas D. Peterson, Covina, CA (US)

(73) Assignee: R.A. Phillips Industries, Inc., Sante Fe Springs, CA (US)

( * ) Notice: Subject to any disclaimer, the term of this patent is extended or adjusted under 35 U.S.C. 154(b) by 0 days.

(21) Appl. No.: 13/021,705

(22) Filed: Feb. 4, 2011

(65) Prior Publication Data  
US 2012/0200078 A1 Aug. 9, 2012

(51) Int. Cl.  
*F16B 23/00* (2006.01)

(52) U.S. Cl. .......................... 285/69; 285/68

(58) Field of Classification Search .............. 285/65–79, 285/127.1, 63, 184, 282  
See application file for complete search history.

(56) References Cited

U.S. PATENT DOCUMENTS

| | | | |
|---|---|---|---|
| 961,699 A * | 6/1910 | Jewett et al. ..................... 285/68 |
| 2,641,272 A * | 6/1953 | Seale ............................. 137/112 |
| 2,996,314 A * | 8/1961 | Aspeek ....................... 251/149.9 |
| 3,108,816 A | 10/1963 | Moore |
| 3,212,746 A | 10/1965 | Wright |
| 3,476,407 A * | 11/1969 | Temple et al. ................... 285/12 |
| 3,706,355 A | 12/1972 | Oglesbee |
| 3,731,953 A * | 5/1973 | Temple ............................ 285/12 |
| 3,960,365 A * | 6/1976 | Horowitz ....................... 251/286 |
| 4,109,673 A * | 8/1978 | Horowitz et al. .............. 137/381 |
| 4,550,928 A * | 11/1985 | Berg .............................. 280/421 |
| 4,810,272 A | 3/1989 | Overby |
| 4,852,915 A * | 8/1989 | Campanini ..................... 285/38 |
| 5,348,043 A * | 9/1994 | Chimera ........................ 137/269 |
| 6,076,380 A | 6/2000 | Hulak |

* cited by examiner

*Primary Examiner* — Aaron Dunwoody  
(74) *Attorney, Agent, or Firm* — Christie, Parker & Hale, LLP

(57) ABSTRACT

A swivel-type cast iron swinger gladhand is provided. The gladhand has a mounting bracket, a cast iron coupler support body, and a cast iron coupler body. The cast iron coupler body includes a pivot arm, a coupler and a clamp integrally formed from a single casting. The cast iron coupler body is pivotally supported by the mounting bracket and the cast iron coupler support body.

12 Claims, 4 Drawing Sheets

CAST IRON GLADHAND

FIELD OF THE INVENTION

The present invention relates generally to gladhands and more particularly to swivel-style, cast iron gladhands.

BACKGROUND

Some heavy duty trucks are composed of a tractor and one or more trailers coupled in series to the rear portion of the tractor. Typically, a trailer is provided with air brakes on its wheels. The air brakes require the connection of air lines extending from an air compressor on the tractor cab to the wheel brakes of the trailer. Normally, tractors and trailers can be interchanged as modular units so that a fleet of tractor cabs and a fleet of trailers can be used interchangeably.

To facilitate the interchangability, the hitches for the tractors and trailers are standardized. The Society of Automotive Engineers (SAE) standard J318 has served the purpose of providing a standard for coupler halves for brake lines on a vehicle that will be identified and compatible with the coupler halves on the brake lines of another vehicle. The SAE standard J318 is, therefore, specifically dedicated to automotive air brake line couplers (also known as gladhands). In addition, the J318 standard provides design, interchangeability dimensions, testing procedures, performance requirements, and minimum identification for gladhand-type air line couplers used to connect the brake systems of trucks, truck-tractors, trailers, and dollies when these vehicles are joined to operate in combination as a unit. The SAE standard J318 is incorporated herein by reference.

The standard gladhand is adapted to serve as a quick connect and disconnect coupling for the two high-pressure air brake hoses which are known as service (or signal) and emergency hoses. A complete gladhand connection is composed of a pair of essentially identical gladhands. The face-abutted gladhands are fully mated by turning one relative to the other until a stop or lock of some sort is reached. The use of gladhands provides a quick means for establishing pneumatic communication between, for example, air brakes of the trailer and the pump on the truck cab.

Normally, a gladhand includes a coupler and a clamp. The coupler typically has a fan-like flange at one end and an opening at the opposite end. The opening leads to an internal air channel which ends at a second opening on the face of the coupler. The opening on the face is typically surrounded by a resilient member. When two face-abutted gladhands are fully mated by turning one on the other, their respective resilient members abut together while the clamp of one gladhand is locked into the flange of the other, and vice versa. Typically, the main body of a gladhand is made of aluminum.

The clamp of the gladhand is usually made of a thin piece of powder coated steel to provide some flexibility when two gladhands are mated. Normally, the clamp is attached to the coupler by a pair of spaced bolts and nuts. However, the thin piece of powder coated steel tends to wear out very quickly, or can be bent from its desired position, with the frequent coupling and uncoupling of the gladhands. This can result in air leakage when two gladhands are mated. In addition, the pair of bolts and corresponding nuts that hold the clamp to the coupler may loosen up over time, which in turn can also allow air to leak through the seal formed by the mating faces of the gladhands.

Some gladhands include a mounting bracket to allow the gladhands to be mounted to a tractor or a trailer. Typically, the bracket is mounted so as to be proximate to the break air hose associated with a tractor or trailer. In order to facilitate the coupling of this type of gladhand with another, the gladhand may be designed to be able to swing (i.e., pivot) along an axis supported by the bracket. To prevent a mating air hose from being damaged as the gladhands are pivoted, the mating air hoses are provided with a live swivel fitting at their mating end. However, the live swivel fitting provided in the mating air hose tends to be of relatively poor quality, resulting in frequent air leaks in the brake system.

Accordingly, there is a need for an improved gladhand which includes a durable clamp for increased life expectancy of the gladhand. In addition, there is a need for an improved swivel-type gladhand which does not require the use of an air hose with a live swivel fitting so as to mitigate leakage at the connection between the air hose and the gladhand and thereby improve the overall integrity of the pneumatic braking system.

SUMMARY OF THE INVENTION

A swivel-type cast iron swinger gladhand is provided. As an example, the swivel-type cast iron swinger gladhand comprises a mounting bracket, a cast iron coupler support body, and a cast iron coupler body. The cast iron coupler body includes a pivot arm, a coupler, a clamp, and a flange integrally formed from a single casting. The cast iron coupler body is pivotally supported by the mounting bracket and the cast iron coupler support body.

The mounting bracket preferably has a stop arm with a stop. The coupler support body is preferably rigidly mounted to the mounting bracket. The coupler body preferably has a pivot arm, a coupler, a clamp, and a flange wherein the pivot arm is pivotally mounted between an extension of the mounting bracket and the coupler support body. The coupler preferably extends outwardly from the pivot arm so as to be swingable in an arc from a first position as the pivot arm is rotated.

An air tight passageway preferably extends from an opening in the coupler support body through the coupler support body and through the pivot arm and coupler to an opening in a coupling face of the coupler. The clamp is preferably operatively configured to clamp a flange of a mating gladhand. The flange preferably extends from an end of the coupler. The pivot arm, the coupler, the clamp, and the flange are preferably all integrally cast from cast iron.

An annular resilient seal member preferably surrounds the opening in the coupling face of the coupler. When the coupler is in the first position, the resilient seal member surrounding the opening in the coupling face of the coupler is abutting the stop. A biasing member preferably biases the coupler to the first position. In one embodiment, the biasing member is a coil spring. The coil spring may have a first end and a second end, the first end may engage with the coupler of the coupler body and the second end may engage with the coupler support body. The biasing element is preferably pre-loaded.

In one embodiment, the clamp includes a ball lock. In a further embodiment, the flange includes a rib with a central slot for engaging with a ball lock from the mating gladhand when the gladhands are engaged to each other. In a further embodiment, the coupler must be rotated from the first position to engage with the mating gladhand.

In one embodiment, the coupler is swingable in an arc of up to 180° from the first position.

In one embodiment, the coupler support body includes a sleeve, and the coupler body includes a cylindrical bore sized to receive the sleeve. In a further embodiment, at least one o-ring is interposed between the sleeve of the coupler support body and the cylindrical bore of the coupler body. In a further embodiment, a plastic ring bushing is interposed between the sleeve of the coupler support body and the cylindrical bore of the coupler body.

In one embodiment, the stop further comprises a seal member extending from the stop so as to extend into the opening in the coupling face of the coupler and circumferentially abut with the annular resilient seal member.

Further aspects, objects, and desirable features, and advantages of the invention will be better understood from the following description considered in connection with the accompanying drawings in which various embodiments of the disclosed invention are illustrated by way of example. It is to be expressly understood, however, that the drawings are for the purpose of illustration only and are not intended as a definition of the limits of the invention.

DETAILED DESCRIPTION OF THE PREFERRED EMBODIMENTS

Figure 1:
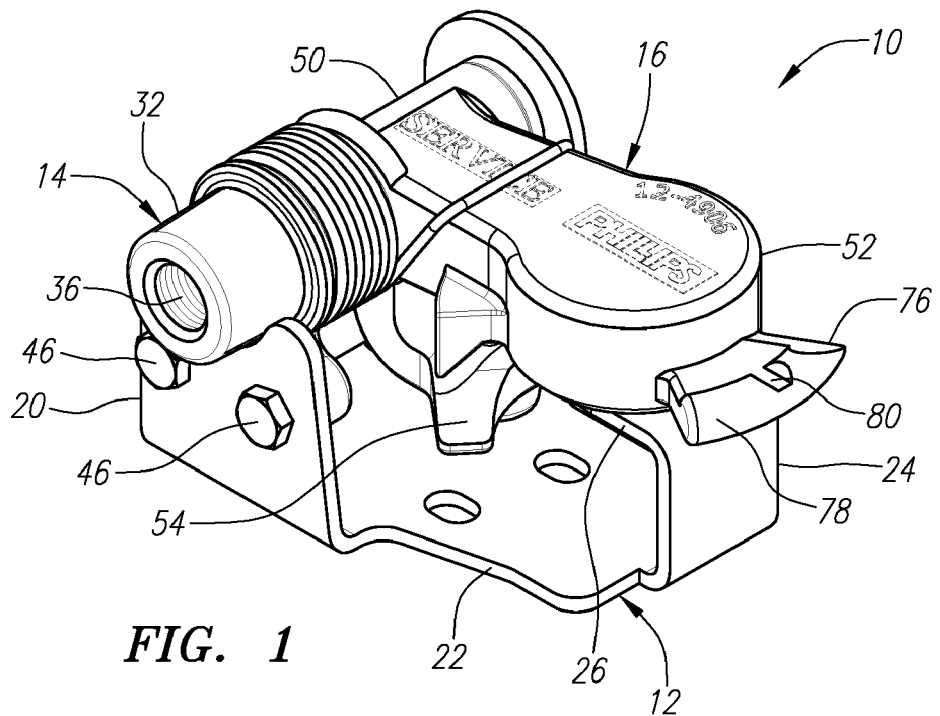
FIG. 1 is a front, left perspective view of an exemplary gladhand.

Embodiments will now be described with reference to the drawings. To facilitate the description, any reference numeral representing an element in one figure will represent the same element in any other figure.

An exemplary gladhand 10 is described in connection with FIGS. 1-8. The exemplary gladhand 10 incorporates a number of distinct aspects. While these distinct aspects have all been incorporated into gladhand 10 in various combinations, the scope of the present invention is not restricted to gladhand 10 described herein. Rather, the present invention is directed to each of the inventive features of gladhand 10 described below both individually as well as in various combinations.

Figure 2:
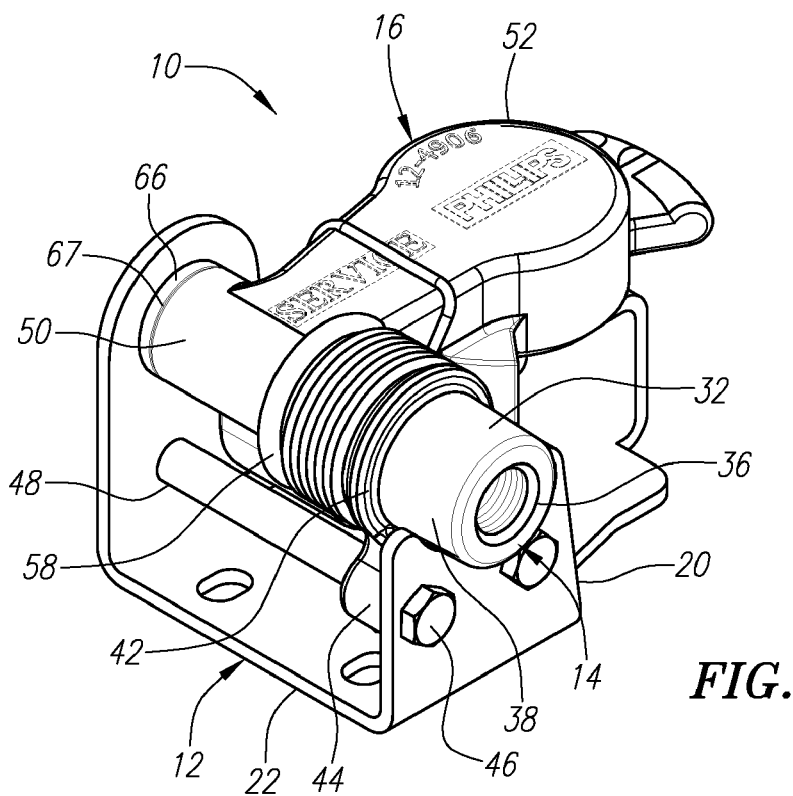
FIG. 2 is a front, right perspective view of the gladhand of FIG. 1.
Figure 3:
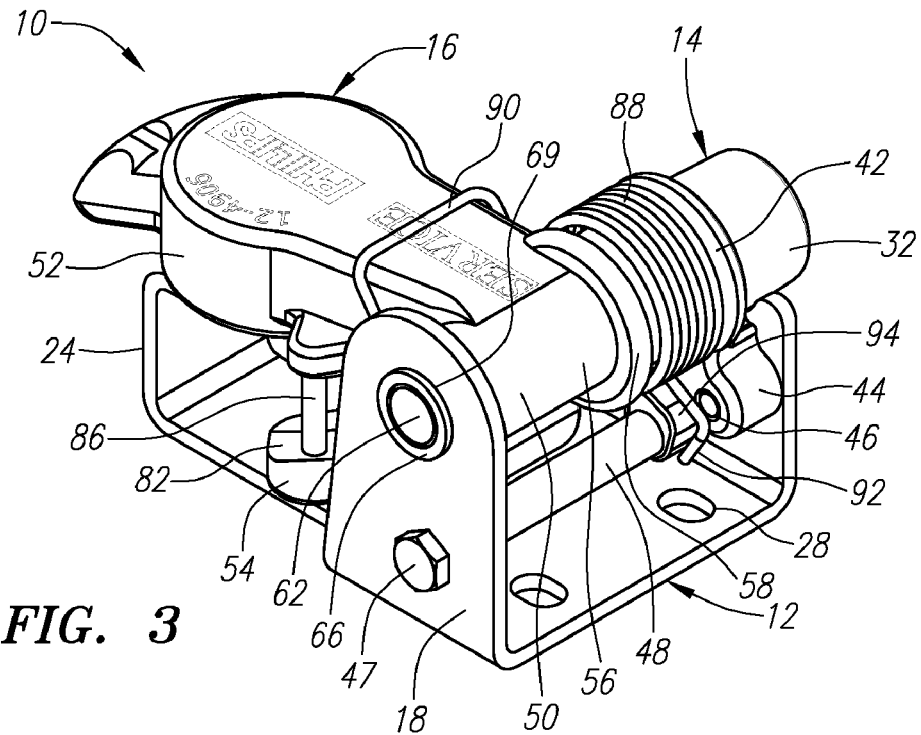
FIG. 3 is another perspective view of the gladhand of FIG. 1.

FIGS. 1-3 are perspective views of the exemplary gladhand 10. The exemplary gladhand 10 preferably includes a mounting bracket 12, a coupler support body 14 and a coupler body 16. Coupler support body 14 and coupler body 16 are preferably cast from cast iron or another suitable metal. Preferably the selected metal has good corrosion resistance to the salts used to de-ice roads. The cast iron coupler body 16 preferably includes a pivot arm 50, coupler 52, clamp 54, and coupling flange 76 integrally formed from a single casting. The cast iron coupler body 16 is pivotally supported by the mounting bracket 12 and cast iron coupler support body 14.

Figure 9:
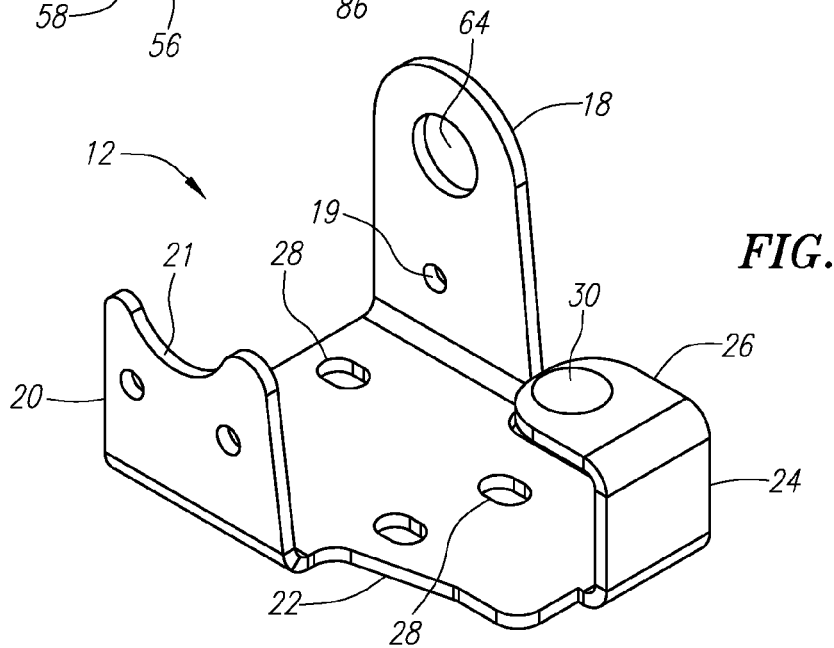
FIG. 9 is a perspective view of an exemplary mounting bracket for the gladhand of FIG. 1.

Referring to FIG. 9, the mounting bracket 12 includes a base 22, an upper extension 18, a lower extension 20, and a stop arm 24. Upper and lower is used here only to aid in the description of the mounting bracket 12, as opposed to indicate that a particular orientation of the bracket is required.

The upper extension 18 and the lower extension 20 generally extend perpendicularly from base 22 so that upper extension 18 and lower extension 20 oppose one another in a parallel manner. Upper extension 18, lower extension 20, and base 22 form a U-shaped bracket to support coupler support body 14 and coupler body 16. Upper extension 18 includes a hole 64 for pivotally supporting coupler body 16. The lower extension 20 includes a saddle 21 for receiving the coupler support body 14 in an axial relationship with the hole 64 of the opposing upper extension 18.

The mounting bracket 12 also includes stop arm 24, which at its proximal end extends generally perpendicular from base 22 and at its distal end includes a stop 26 that generally extends toward upper and lower extensions 18, 20 so that the stop 26 is parallel to and opposes base 22. As a result, base 22 and stop arm 24 have a J-shaped configuration in cross-section.

Stop 26 preferably includes a seal member 30 having the shape of a segment of a sphere. The seal member 30 extends in a direction away from base 22.

Base 22 preferably has holes 28 through which conventional fasteners may be extended in order to secure the bracket 12 to a tractor or a trailer.

For ease of manufacture, mounting bracket 12 is preferably made out of stamped and folded steel. Mounting bracket 12 is also preferably yellow zinc plated for enhanced corrosion resistance. Other suitable materials systems may also be used. Similarly, the mounting bracket 12 may also have other suitable configurations.

Figure 4:
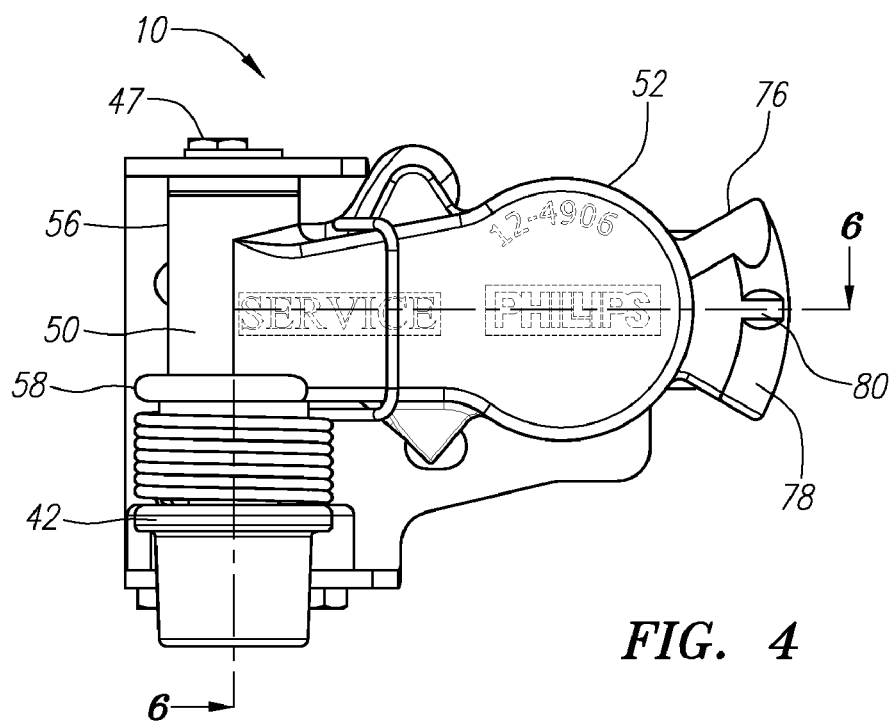
FIG. 4 is a front plan view of the gladhand of FIG. 1.
Figure 5:
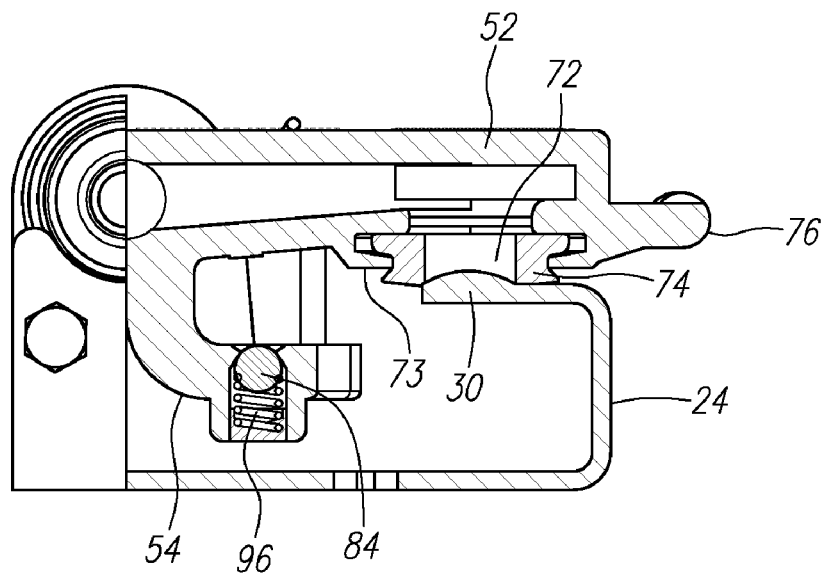
FIG. 5 is a cross-sectional view of the gladhand of FIG. 4 taken along the line 6-6.
Figure 6:
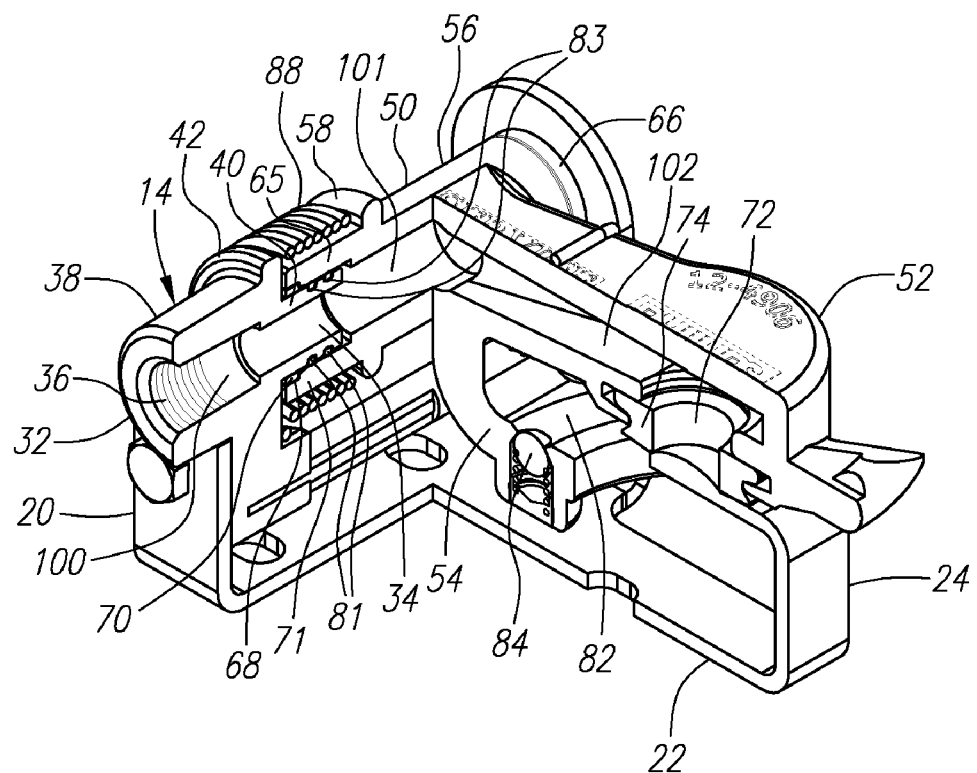
FIG. 6 is a perspective view of the cross-sectional view of FIG. 5.
Figure 7:
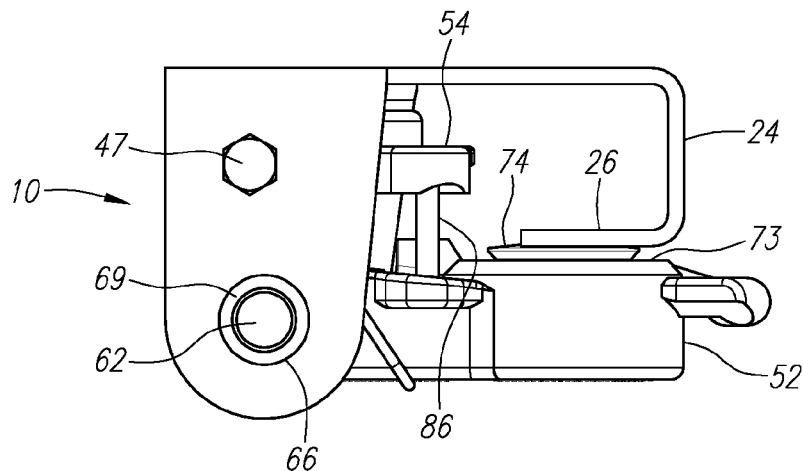
FIG. 7 is a top plan view of the gladhand of FIG. 1.
Figure 8:
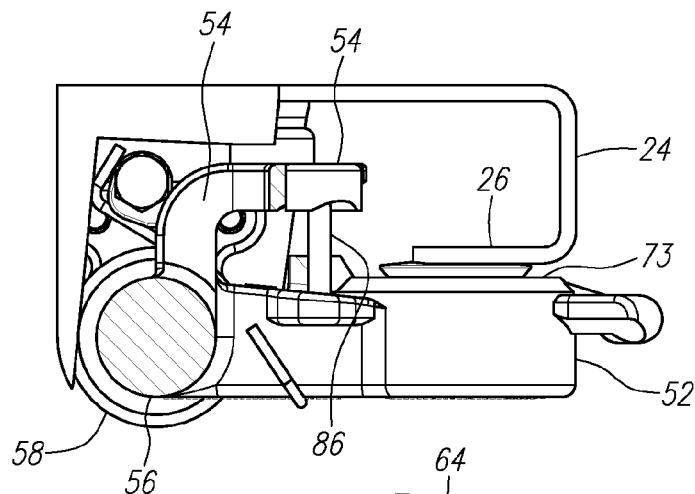
FIG. 8 is a top plan view of the gladhand of FIG. 1 with the bracket and upper casting partially cutaway.

Reference is now made to FIGS. 1-8 in which: FIG. 4 is a front plan view of the gladhand 10; FIG. 5 is a cross-sectional view of the gladhand 10 of FIG. 4 taken along line A-A of FIG. 4; FIG. 6 is a perspective view of cross-sectional view of the gladhand 10 of FIG. 5; FIG. 7 is a is a top plan view of the gladhand of FIG. 1; and FIG. 8 is a top plan view of the gladhand of FIG. 1 with the bracket and upper casting partially cutaway.

The coupler support body 14 is preferably rigidly mounted to the lower extension 20 of the mounting bracket 12. The coupler support body 14 may be mounted to the lower extension 20 in any conventional manner, including, for example bolt fasteners 46.

The coupler support body 14 preferably comprises a cylindrical body portion 32 having a passageway 100 extending therethrough so as to provide the cylindrical body portion 32 with an upper opening 34 and a lower opening 36. The cylindrical body portion 32 preferably comprises a barrel 38, an annular sleeve 40, and an annular flange 42 interposed between them. The barrel 38 is disposed in a saddle 21 formed in the distal end of the lower extension 20 so that the axis of the passageway 100 is aligned with hole 64 in the upper extension 18.

In the present embodiment, the coupler support body 14 also comprises a mounting boss 44 that preferably extends from the barrel 38 and annular flange 42. The coupler support body 14 is preferably made as a unitary casting of cast iron. Mounting boss 44 serves to properly locate the coupler support body 14 relative to the mounting bracket 12 so that the axis of sleeve 40 aligns with the axis of hole 64. Mounting boss 44 also serves as a mount for rigidly mounting the coupler support body 14 to the lower extension 20 of the mounting bracket 12 of the gladhand 10. The coupler support body 14 is preferably mounted to the lower extension 20 using bolt fasteners 46. Bolt fasteners 46 directly bolt into mating threaded holes provided in mounting boss 44 of the coupler support body 14. Therefore, the coupler support body 14 is not rotatable with respect to the mounting bracket 12.

A bolt 47 may also be provided to extend through hole 19 in the upper extension 18 and bolt into a mating threaded hole provided on the opposite side of the mounting boss 44. A tubular sleeve 48 may be provided over bolt 47 to shield the threads of bolt 47. The bolt 47 adds structural support to mounting bracket 12 and helps to keep the upper extension 18 and the lower extension 20 in a parallel arrangement.

Although the use of bolts has been described to rigidly mount the coupler support body 14 to the mounting bracket 12, any suitable means for rigidly mounting the coupler support body 14 to mounting bracket 12 may be used.

Because the coupler support body 14 remains stationary relative to the mounting bracket 12, an air hose can be coupled to threads provided in lower opening 36 of the coupler support body 14 via, for example, a conventional threaded fitting. Thus, a live swivel fitting may be omitted from the air hose, and the problem of air leakage caused by the use of live swivel fittings in mating air hoses can be eliminated.

The coupler body 16 comprises a pivot arm 50, a coupler 52 extending from the pivot arm 50, a clamp 54, flange 76, and air passageways 101, 102.

The pivot arm 50 of the cast iron coupler body 16 is pivotally mounted between the upper extension 18 and the coupler support body 14. The pivot arm 50 includes a barrel portion 56 having a mating end 65 and an annular flange 42 spaced from the mating end 65. The pivot arm 50 also includes a cylindrical peg 62 extending from the end of the pivot arm 50 opposite the mating end 65.

Referring to FIGS. 3, 7 and 9, the cylindrical peg 62 is pivotally supported within hole 64 of mounting bracket 12. A plastic flange bushing 66 with a cylindrical hole for pivotally receiving peg 62 is preferably interposed between peg 62 and the perimeter, which in the present embodiment corresponds to the circumference, of hole 64 to reduce friction between the peg 62 and the upper extension 18 of the bracket 12 as the pivot arm 50 is rotated. The plastic flange bushing 66 includes a flange element 67 positioned so that it is interposed between the end of the barrel portion 56 and the upper extension 18. The flange element 67, not only helps space the barrel portion 56 from the upper extension 18, but it also prevents metal to metal contact between the end of the barrel portion 56 and the side of the upper extension 18. The flange bushing 66 may also include a retainer 69 for retaining the flange bushing 66 within hole 64, particularly during the manufacturing process. Retainer 69 is dimensioned so that it is slightly larger than the size of hole 64 so that flange bushing 66 may be forced into hole 66 without damaging the bushing. The properties of the selected plastic should be such that the retainer 69 will retain the flange bushing 66 within the hole 64 under normal handling conditions. Suitable materials for flange bushing 66 include polyacetal thermoplastics and DELRIN®, however other suitable materials may also be used.

The mating end 65 of barrel 56 includes a cylindrical bore 71 sized to receive the sleeve 40 of the coupler support body 14. A plastic ring bushing 70 is disposed in an annular groove 68 provided in the wall of the cylindrical bore 71. In the present embodiment, ring bushing 70 is disposed at the proximal end of mating end 65. The plastic ring bushing 70 concentrically spaces the sleeve 40 from the wall of the cylindrical bore 71 and prevents metal to metal contact between the pivot arm 50 and sleeve 40. Plastic bushing 70 may be made out of nitrile rubber or any other suitable material.

Two o-rings 81 are preferably interposed between the wall of the cylindrical bore 71 and the sleeve 40 to provide an air tight seal between the coupler support body 14 and the coupler body 16 pivotally mounted thereon. To keep the o-rings 81 properly located, each is preferably disposed in an annular groove 83 provided in the surface of the sleeve 40. Other airtight sealing means may also be used.

Air passageway 101 extends from the mating end 65 through the barrel portion 56 so that it intersects with passageway 102, which in turn extends through coupler 52 and terminates at coupling face 73 of the coupler 52. Coupling face 73 has an opening 72 which is located to oppose the seal member 30 of the mounting bracket 12 when the coupler body 16 is in a rest position. The opening 72 is preferably provided with a annular resilient seal 74 that circumferentially abuts the seal member 30 when the coupler body 16 is in the rest position. The seal 74 preferably includes a pair of annular flanges for mounting to the coupler 52 within the opening 72. The seal 74 is preferably made out of resilient material, such as polyurethane. Other suitable materials may also be used.

The coupler 52 preferably extends outwardly from the pivot arm 50. The coupler 52 swings in an arc as pivot arm 50 rotates about its axis. Therefore, the resilient seal 74 can be moved away from the seal member 30 to a mating position in which the annular resilient seal of a mating gladhand can abut seal 74 and the two gladhands can be mated. In one embodiment, the coupler 52 is able to swing through an angle of up to approximately 180°.

The coupler 52 preferably has a fan-like outer flange element 76 extended outwardly from the coupler 52. The outer flange element 76 is preferably provided with a raised arcuate rib 78. A groove 80 is preferably provided at about the middle of the arcuate rib 78. As more fully described below, the flange 76 of the gladhand 10 is designed to be engaged with a clamp 54 of another gladhand.

Referring to FIG. 6, an air passageway (or channel), comprising passageways 100, 101, and 102, extends from the opening 36 through the coupler support body 14 and coupler body 16 to the opening 72 in the coupling face 73 where it terminates. As a result, the gladhand 10 enables a coupling to be achieved quickly between the air line systems of a tractor and a trailer.

In the present embodiment, the clamp 54 is integrally cast integrally as part of the coupler body 16. As a result, the clamp 54 has improved durability and thus is less likely to be damaged during repeated coupling and uncoupling operations between opposing gladhands. The clamp 54 preferably extends toward coupling face 73 from a location adjacent the pivot arm 50. At least a portion of the clamp 54 is disposed in an opposing relationship with the coupler 52 so that in cross-section, the coupler 52 and clamp 54 form a C-shape. The opposing portion of the clamp 54 is spaced sufficiently from the coupler 52 so that a flange 76 of a mating gladhand may be rotatably interposed therebetween.

The clamp 54 is preferably provided with an arcuate groove 82. A ball lock 84 is preferably provided at around the middle of the arcuate groove 82. The ball of ball lock 84 is biased by a spring 96 so as to extend into arcuate groove 82. When a mating gladhand is coupled to gladhand 10, the arcuate groove 82 of gladhand 10 is able to engage with an arcuate rib 78 of a flange 76 from the other gladhand. Further, due to the biasing force provided by spring 96, the ball of ball lock 84 from gladhand 10 is biased to extend into the groove 80 of flange 76 the other gladhand as it is rotated relative to gladhand 10. Conversely, a clamp 54 of the other gladhand will clamp onto flange 76 of gladhand 10 in the same manner as the other gladhand is rotated relative to gladhand 10. Moreover, as the other gladhand is rotated relative to gladhand 10, the ball of ball lock 84 of the clamp 54 of the other gladhand will extend into recess 80 of flange 76 of gladhand 10. In this manner, when another gladhand is connected to gladhand 10, the two gladhands will remain connected under normal use conditions with their respective seal elements 74 in abutting contact and with the openings 72 therein aligned. Although ball lock 84 is preferably used herein to firmly hold the two gladhands together, other locking mechanisms may also be employed.

Referring also to FIG. 8, a pin 86 is preferably disposed between the coupler 52 and the clamp 54 to prevent outer flange element 76 of the mating gladhand from over-rotating during the coupling process.

In the present embodiment, the clamp 54 is preferably integrally formed with the pivot arm 50 and the coupler 52 out of cast iron. Because the clamp 54, the pivot arm 50, and the coupler 52 are integrally made out of cast iron, the clamp 54, the pivot arm 50, and the coupler 52 together form a rigid structure so that the clamp 54 and the coupler 52 will always maintain a relatively constant distance, even after repeated coupling and uncoupling cycles with another gladhand. As a result, air leaks through abutting seals 74 of matting gladhands will be substantially reduced.

Referring to FIG. 3, coil spring 88 is coiled around the barrel portion 56 and is disposed between the annular flange 42 of the coupler support body 14 and the flange 58 of the coupler body 16. Coil spring 88 has a first end 90 wrapped around coupler 52 and a second end 92 disposed on the surface of spring block 94 provided on mounting boss 44 so that it biases the coupler 52 toward stop 26 and its closed position. Spring 88 is preferably pre-loaded to allow for a longer spring life cycle, and hence a longer life expectancy of gladhand 10. Those skilled in the art will understand that other types of biasing elements or springs may also be employed to bias coupler 52 against stop 26.

When gladhand 10 is disconnected from a mating gladhand, unless held by an operator, spring 88 will automatically cause the coupler 52 of the gladhand 10 to move to its rest position. In this position, the annular seal 74 will abut the seal member 30 of stop 26. Because of this engagement, the air passageways 100, 101, and 102, as well as the tractors pneumatic system in general, are protected from contamination, including dirt, debris, oil and the like. In addition, airflow through the gladhand is terminated at opening 72 by the engagement of the annular seal 74 with the seal member 30.

Although the invention has been described with reference to preferred embodiments and specific examples, those of ordinary skill in the art will readily appreciate that many modifications and adaptations of the invention are possible without departure from the spirit and scope of the invention as claimed hereinafter.

What is claimed is:

1. A gladhand comprising:
   a mounting bracket having a stop arm with a stop;
   a coupler support body rigidly mounted to the mounting bracket;
   a coupler body having a pivot arm, a coupler, a clamp, and a flange wherein the pivot arm is pivotally mounted between an extension of the mounting bracket and the coupler support body, wherein the coupler extends outwardly from the pivot arm so as to be swingable in an arc from a first position as the pivot arm is rotated, wherein an air tight passageway extends from an opening in the coupler support body though the coupler support body and through the pivot arm and coupler to an opening in a coupling face of the coupler, wherein the clamp is operatively configured to clamp a flange of a mating gladhand, wherein the flange extends from an end of the coupler, and wherein the pivot arm, the coupler, the clamp, and the flange are all integrally cast from cast iron;
   an annular resilient seal member surrounding the opening in the coupling face of the coupler, wherein the coupler is in the first position, the resilient seal member surrounding the opening in the coupling face of the coupler is abutting the stop; and
   a biasing member biasing the coupler to the first position.

2. The gladhand according to claim 1, wherein the clamp includes a ball lock.

3. The gladhand according to claim 2, wherein the flange includes a rib with a central slot for engaging with a ball lock from the mating gladhand when the gladhands are engaged to each other.

4. The gladhand according to claim 3, wherein to engage with the mating gladhand, the coupler must be rotated from the first position.

5. The gladhand according to claim 1, wherein the coupler is swingable in an arc of up to 180° from the first position.

6. The gladhand according to claim 1, wherein the biasing member comprises a coil spring.

7. The gladhand according to claim 6, wherein the coil spring has a first end and a second end, the first end engages with the coupler body and the second end engages with the coupler support body.

8. The gladhand according to claim 6 or 7, wherein the biasing member is preloaded.

9. The gladhand according to claim 1, wherein the coupler support body includes a sleeve, and wherein the coupler body includes a cylindrical bore sized to receive the sleeve.

10. The gladhand according to claim 9, further comprising at least one o-ring interposed between the sleeve of the coupler support body and the cylindrical bore of the coupler body.

11. The gladhand according to claim 10, further comprising a plastic ring bushing interposed between the sleeve of the coupler support body and the cylindrical bore of the coupler body.

12. The gladhand according to claim 1, wherein the stop further comprises a seal member extending from the stop as to extend into the opening in the coupling face of the coupler and circumferentially abut the annular seal member.

\* \* \* \* \*